(12) United States Patent
Reiter

(10) Patent No.: US 10,443,685 B2
(45) Date of Patent: Oct. 15, 2019

(54) LOW-NOISE CHAIN

(71) Applicant: SRAM Deutschland GmbH, Schweinfurt (DE)

(72) Inventor: Markus Reiter, Schweinfurt (DE)

(73) Assignee: SRAM DEUTSCHLAND, GMBH, Schweinfurt (DE)

( * ) Notice: Subject to any disclaimer, the term of this patent is extended or adjusted under 35 U.S.C. 154(b) by 229 days.

(21) Appl. No.: 15/355,342

(22) Filed: Nov. 18, 2016

(65) Prior Publication Data

US 2017/0067537 A1 Mar. 9, 2017

Related U.S. Application Data

(60) Continuation of application No. 13/960,949, filed on Aug. 7, 2013, now Pat. No. 9,528,588, which is a division of application No. 10/711,842, filed on Oct. 8, 2004, now Pat. No. 8,517,874.

(30) Foreign Application Priority Data

Oct. 10, 2003 (DE) .................................. 103 47 784

(51) Int. Cl.
*F16G 13/06* (2006.01)
*B62M 9/10* (2006.01)
*F16H 55/30* (2006.01)

(52) U.S. Cl.
CPC ............... *F16G 13/06* (2013.01); *B62M 9/10* (2013.01); *F16H 55/30* (2013.01)

(58) Field of Classification Search
CPC ... F16G 13/06; B62M 9/10; B62M 2009/005; F16H 55/30; B21L 9/065

USPC ........................................................ 474/226
See application file for complete search history.

(56) References Cited

U.S. PATENT DOCUMENTS

| 4,268,259 | A | | 5/1981 | Segawa et al. |
| 4,596,539 | A | * | 6/1986 | Yamasaki ................ B62M 9/10 474/206 |
| 4,889,521 | A | | 12/1989 | Nagano |
| 4,983,147 | A | * | 1/1991 | Wu .......................... F16G 13/06 474/206 |
| 5,066,264 | A | | 11/1991 | Campagnolo |
| 5,066,265 | A | * | 11/1991 | Wu .......................... F16G 13/06 474/206 |

(Continued)

FOREIGN PATENT DOCUMENTS

| DE | 7931661 | 9/1979 |
| DE | 4330989 | 3/1995 |

(Continued)

*Primary Examiner* — Henry Y Liu

(57) ABSTRACT

A chain may be engageable with a chainwheel assembly that includes a plurality of chainwheels having different tooth counts. The chain includes a plurality of inner links having inner link plates, a plurality of outer links having outer link plates, and a plurality of pins joining the outer and inner links in alternating sequence. The chain also may include the inner link plate having a chamfer disposed on a surface of a link plate, the chamfer disposed on a central region of an inner link extending between two points, the chamfer having a contour between the two points that is discontinuous at a central region of the inner link plate. The chain also may include a second chamfer and the first chamfer forming a ridge of constant thickness therebetween.

17 Claims, 8 Drawing Sheets

(56) References Cited

U.S. PATENT DOCUMENTS

| | | | | |
|---|---|---|---|---|
| 5,073,153 | A | * | 12/1991 | Wu .................... F16G 13/06 474/206 |
| 5,151,066 | A | * | 9/1992 | Wu .................... F16G 13/06 474/206 |
| 5,192,248 | A | | 3/1993 | Nagano |
| 5,192,249 | A | | 3/1993 | Nagano |
| 5,192,250 | A | * | 3/1993 | Kobayashi ............ B62M 9/10 474/160 |
| 5,226,857 | A | * | 7/1993 | Ono .................... F16G 13/06 474/231 |
| 5,299,925 | A | | 4/1994 | Chang |
| 5,409,422 | A | * | 4/1995 | Feng .................... B62M 9/10 474/156 |
| 5,437,577 | A | * | 8/1995 | Wu .................... B62M 9/00 474/218 |
| 5,465,568 | A | * | 11/1995 | Wang .................. B62M 9/10 474/206 |
| 5,503,598 | A | | 4/1996 | Neuer et al. |
| 5,514,042 | A | | 5/1996 | Liou |
| 5,545,096 | A | | 8/1996 | Su |
| 5,716,297 | A | | 2/1998 | Bodmer et al. |
| 5,738,603 | A | | 4/1998 | Schmidt et al. |
| 5,741,196 | A | * | 4/1998 | Campagnolo ........... B62M 9/10 474/206 |
| 5,782,712 | A | | 7/1998 | Campagnolo |
| 5,876,159 | A | | 3/1999 | Tseng et al. |
| 5,876,296 | A | | 3/1999 | Hsu et al. |
| 6,013,001 | A | | 1/2000 | Miyoshi |
| 6,045,472 | A | | 4/2000 | Sung et al. |
| 6,110,064 | A | * | 8/2000 | Guichard ............... F16G 13/06 474/230 |
| 6,139,456 | A | | 10/2000 | Lii et al. |
| 6,340,338 | B1 | * | 1/2002 | Kamada .................. B62M 9/10 474/152 |
| 7,267,220 | B2 | * | 9/2007 | Wang .................... F16G 13/06 198/850 |
| 7,325,391 | B1 | * | 2/2008 | Oishi .................... F16G 13/06 59/5 |
| 7,427,251 | B2 | * | 9/2008 | Reiter .................... F16G 13/06 474/206 |
| 7,837,584 | B2 | * | 11/2010 | Wu .................... F16G 13/06 474/218 |
| 7,946,941 | B2 | * | 5/2011 | Oishi .................... F16G 13/06 474/206 |
| 8,517,874 | B2 | * | 8/2013 | Reiter .................... B62M 9/10 474/152 |
| 9,541,159 | B2 | * | 1/2017 | Wang .................... F16G 13/06 |
| 9,939,045 | B2 | * | 4/2018 | Fukumori ............... F16G 13/06 |
| 2001/0039224 | A1 | | 11/2001 | Lim et al. |
| 2002/0086753 | A1 | | 7/2002 | Yahata |
| 2002/0173395 | A1 | | 11/2002 | Reiter et al. |
| 2004/0043855 | A1 | | 3/2004 | Wei |
| 2004/0142782 | A1 | | 7/2004 | Kamada et al. |
| 2005/0020394 | A1 | * | 1/2005 | Valle .................... B62M 9/00 474/155 |
| 2005/0079940 | A1 | * | 4/2005 | Reiter .................... B62M 9/10 474/160 |

FOREIGN PATENT DOCUMENTS

| | | |
|---|---|---|
| DE | 4434752 | 4/1996 |
| DE | 19705018 | 9/1997 |
| DE | 29823479 | 7/1999 |
| DE | 69705008 | 3/2002 |
| DE | 10159773 | 10/2002 |
| EP | 0429007 | 5/1991 |
| EP | 0444645 | 9/1991 |
| EP | 0313345 | 1/1994 |
| EP | 1188658 | 11/2005 |
| EP | 0934871 | 3/2006 |
| GB | 475021 | 11/1937 |

* cited by examiner

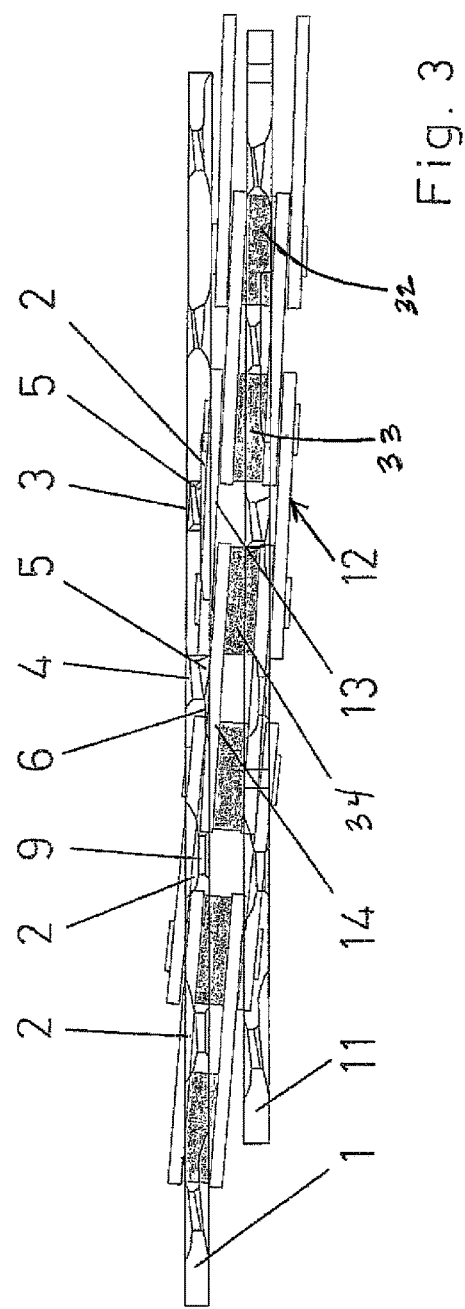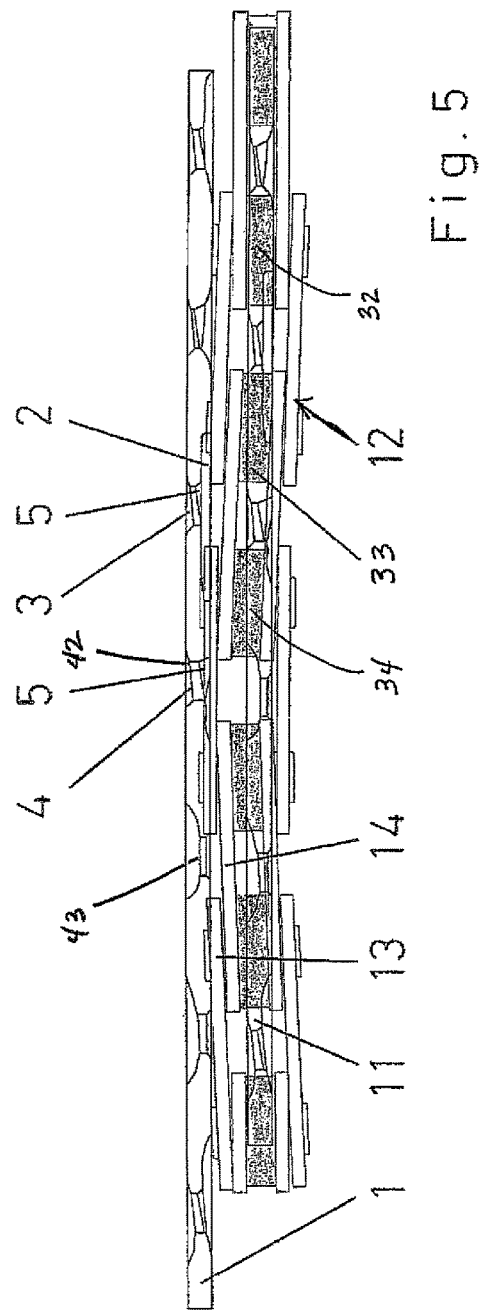

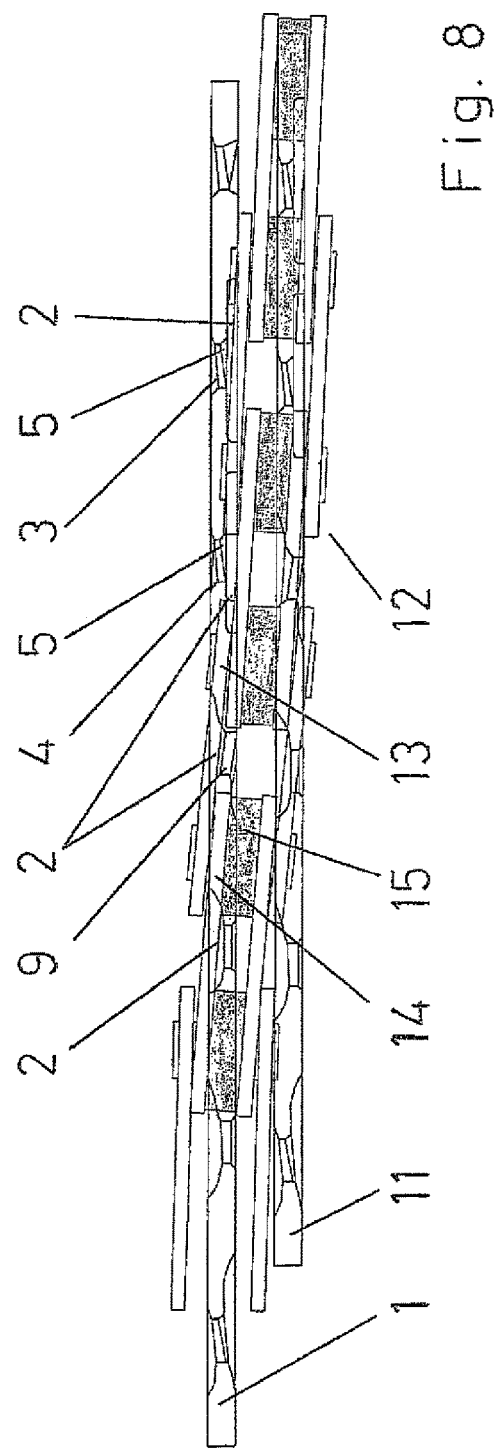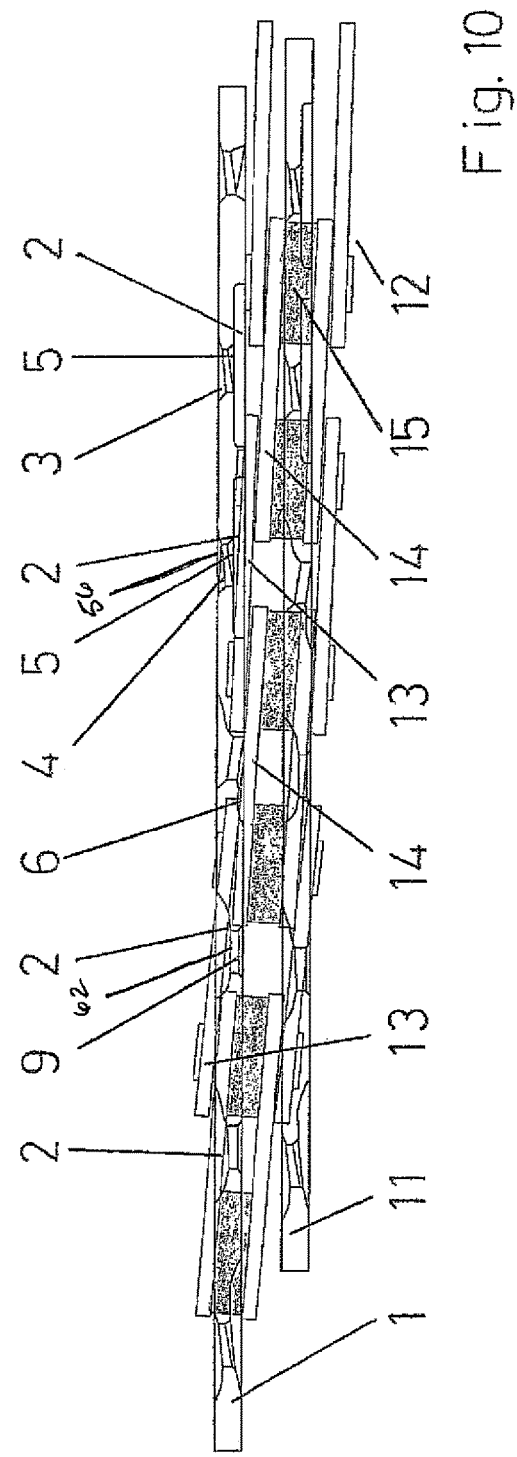

LOW-NOISE CHAIN

This application is a continuation of U.S. patent application Ser. No. 13/960,949, filed Aug. 7, 2013, which is a divisional of U.S. patent application Ser. No. 10/711,842, filed Oct. 8, 2004, which claims priority to German Patent Application DE 10347784.5, filed Oct. 10, 2003.

BACKGROUND OF THE INVENTION

The present invention relates to bicycle derailleur shifting systems and more particularly to a chainwheel assembly including a larger diameter chainwheel having at least one tooth group configured to reduce noise when shifting a chain from a smaller chainwheel to the larger chainwheel.

A conventional derailleur shifting system includes a driving chainwheel assembly, a driven chainwheel assembly and a chain extending therebetween. At least one of the chainwheel assemblies includes a plurality of chainwheels having varying tooth counts. The chain includes successive pins connecting pairs of inner and outer link plates arranged in alternating sequence. A derailleur shifts the chain between chainwheels. As the chain is shifted from a smaller chainwheel to a larger chainwheel, it forms a transition region extending from a chain link that is last to engage between two teeth of the smaller diameter chainwheel to a chain link that is first to engage between two teeth of the larger chainwheel. The first tooth on the larger chainwheel, in the drive rotation direction, before the space into which a chain link would fit during the shifting operation is referred to as the reference tooth, while the tooth that is the first to penetrate between a pair of link plates is referred to as the chain capture tooth. During the shifting of the chain from a smaller chainwheel to a larger chainwheel, the chain capture tooth first fits between a pair of outer link plates because the spacing between the outer link plates is wider than the spacing between a pair of inner link plates. During the shifting operation, a pair of inner link plates presses tightly against the tooth located before the chain capture tooth, in the drive rotation direction, thus facilitating penetration of the chain capture tooth between the outer link plate pair. Since the gap between the inner link plates is narrow, a centerline of the transition region of the chain comes closer to the chain capture tooth when the inner link plate is against the larger chainwheel than when an outer link plate is against the larger chainwheel.

To facilitate the shifting of the chain from the smaller chainwheel to the larger chainwheel, features have been provided on the teeth of the larger chainwheel to define the course of the transition region of the chain. For example, U.S. Pat. No. 4,268,259 discloses a chainwheel assembly engagable by a roller chain for a derailleur shifting system. To improve the shifting operation, a smaller chainwheel and a larger chainwheel are arranged such that a center between a pair of adjacent teeth on the larger chainwheel is positioned on a tangent extending from the center between a pair of adjacent teeth on the smaller chainwheel. The distance between the two centers is equal to an integer multiple of the chain pitch. With this configuration, the first tooth that is behind the center on the larger chainwheel, in the driving rotation direction, is the chain capture tooth. When a pair of outer link plates arrives at the chain capture tooth, the chain capture tooth penetrates into the wide space between the outer link plates. However, when a pair of inner link plates arrives at the chain capture tooth, the chain capture tooth does not penetrate into the narrow space between the inner link plates. Thus the following tooth that also has a configuration of a chain capture tooth penetrates the wide space between the next pair of outer link plates. Having two adjacent chain capture teeth and the tangential spacing between the larger and smaller chainwheels facilitates the shifting of the chain from the smaller to the larger chainwheel.

European Patent No. 0 313 345 discloses another example of a chainwheel assembly engageable by a roller chain for a derailleur shifting system. To improve the shifting of the chain from a smaller chainwheel to a larger chainwheel, the two chainwheels are oriented to have defined tooth positions with respect to each other and certain teeth on the larger chainwheel have recesses on a front face of the larger chainwheel facing the smaller chainwheel. Additionally, the larger chainwheel includes at least one tooth, after the recess in the drive rotation direction, configured to fit into the gap between the outer link plates. Thus, this tooth functions as a chain capture tooth. If a pair of inner link plates is located at the chain capture tooth, the chain capture tooth cannot fit into the narrow gap between the inner link plates. The inner link plate runs laterally past the chain capture tooth and the next tooth becomes the chain capture tooth that fits into the wider gap of the outer link plates. Accordingly, three teeth may be configured as chain capture teeth or chain capture teeth, while the remaining teeth are configured to be non-engaging teeth. The depth of the recesses approximately equals a thickness of the link plate and are configured as run-in or run-on ramps that facilitate the shifting of the chain from a smaller chainwheel to a larger chainwheel.

One drawback of the above chainwheel designs is that they cause shifting noises. A shifting of the chain from a smaller chainwheel to a larger chainwheel is accomplished by the derailleur laterally engaging the chain at an unloaded or untension segment of the chain, allowing the shifting operation to be initiated with low shifting forces and the untension chain segment to move to the larger chainwheel. At the same time, the tension segment of the chain is still located on the smaller chainwheel. However, as the chainwheel assembly continues to rotate, the previously untension chain segment moves into the tension chain segment. The tension segment of the chain rotates away from the last tooth of the smaller chainwheel and shifts from the smaller chainwheel to the larger chainwheel. This changes the axial position of the chain on the chainwheel assembly. When the tension segment of the chain shifts to the larger chainwheel, the chain slides up laterally on the large chainwheel and then jumps over the last tooth located before the chain capture tooth, rubbing over a back of the tooth, resulting in noise. Shifting noises are mainly caused by the tension segment of the chain. The greater the tension or load, the greater the angle between the chain segment sliding up laterally on the larger chainwheel tooth and the chain segment running off the larger chainwheel after the shifting operation, the greater the noise.

SUMMARY OF THE INVENTION

An object of the present invention is to provide a low-noise chainwheel assembly that eliminates or at least reduces the noises that occur as a tension chain segment jumps onto a larger chainwheel from a smaller chainwheel. This object is accomplished by ensuring that at the beginning of the shifting operation, the chain does not run onto a reference tooth and its following tooth. Further, the object is accomplished by ensuring that at the end of the shifting operation, the inner link plates located before the chain capture tooth come as close as possible to a back face of the larger chainwheel before the inner link plates jump over the corresponding tooth back, preventing the inner link plate from abruptly jumping over the back of the tooth located before the chain capture tooth.

One embodiment of the present invention provides a chainwheel assembly for a derailleur shifting system that includes at least one smaller chainwheel, at least one larger chainwheel and a chain extending therebetween. The larger chainwheel and the smaller chainwheel are oriented relative to each other such that a distance defined between a center of the chain roller positioned between a pair of adjacent teeth on the larger chainwheel and the center of the chain roller between a pair adjacent teeth on the smaller chainwheel are substantially an integer multiple of the chain pitch.

The larger chainwheel includes at least a first tooth of the pair of adjacent teeth on the larger chainwheel that includes a lateral recess disposed on a front face of the larger chainwheel facing the smaller chainwheel to allow the chain to move from the smaller sprocket towards the larger chainwheel. At least a second tooth of the pair of adjacent teeth disposed adjacent to the first tooth opposite the drive rotation direction has a configuration to prevent the second tooth from capturing the chain. Front faces of the first or reference tooth and the second or following tooth are configured such that chain link plate that slides, at the end of the shifting operation, laterally along the reference tooth can travel the longest possible axial distance toward a back face before it jumps over a back of the tooth. This is achieved by providing a recess on a front face of the larger chainwheel in the region of the reference tooth. The recess prevents, at the beginning of the shifting operation, insertion of the reference tooth into the gap between the outer link plates. The following tooth has a deflection chamfer on a top of the tooth that tapers away from the drive rotation direction. Further, the following tooth may include a run-out chamfer located on an edge of the following tooth facing away from the reference tooth that extends from the tooth root to the tooth back. The run-out chamfer on the one hand assists the shifting operation in the initial phase by forming a shifting lane for the inner link plate; and on the other hand, together with the deflection chamfer on the tooth back, allows the inner link plate to come axially closer to the back face of the chainwheel as the inner link plate slides up at the end of the shifting operation. Accordingly, by having the recess or the deflection chamfer and the run-out bevel, the axial distance traveled by the inner link plate over the tooth before the chain capture tooth is minimized.

The present invention also ensures that at the end of the shifting operation, the inner link plate is not located opposite an axially wide tooth, but rather is against a tooth having a recess or a deflection chamfer. As stated above, this is achieved by providing two teeth that do not function as chain capture teeth, a reference tooth having a recess and the following tooth disposed adjacent it having a recess or a deflection chamfer. The recesses on the reference tooth and on the following tooth have approximately the same contour. The recesses are located in the region of the teeth on a front face of the larger chainwheel and extend radially inward toward the height of the tooth root of the adjacent smaller chainwheel. The recess below the reference tooth, together with the flank of the following tooth, constitutes a run-on ramp extending oppositely to the drive direction, against which the front segment of the corresponding outer link plate can brace and onto which it can run, upon shifting onto the larger chainwheels. The run-on ramp extends to the tooth root, thereby delimiting the two recesses from each other.

The primary function of the chainwheel teeth is to transfer torque but they also make the shifting operation easier or more difficult. Whether shifting of the chain from a smaller chainwheel to a larger chainwheel is successful is greatly influenced by the orientation of the tooth spacing of the two chainwheels and the shape of the teeth on the larger chainwheel. In order for the chain to shift to a larger chainwheel, the chain must be located next to a tooth space of the larger chainwheel and sufficient freedom of motion must also exist in the axial direction for the lateral deflection of the chain. A shifting lane that permits axial deflection of the chain is created by the lateral recess on the reference tooth and the following tooth disposed adjacent the reference tooth opposite the drive rotation direction. This reference tooth is located before a tooth space, in the drive rotation direction, that is currently next to a corresponding chain link of the transition segment of the chain.

During a shift operation, when an outer link plate arrives next to the reference tooth, it braces itself against the run-on ramp, the following inner link plate pivots laterally past the following tooth disposed adjacent the reference tooth, and the gap between the following pair of outer link plates arrives over the second tooth following the reference tooth which is the chain capture tooth. The chain capture tooth has a narrow tooth back oriented in accordance with the outer link plate. The subsequent link plates are then constrained to run onto the larger chainwheel, and the teeth of the smaller chainwheel move out of the gap between the link plates of the tension chain segment and pull away downward.

At the end of the shifting operation, when the tension segment of the chain changes directions slightly and jumps from the smaller chainwheel to the larger chainwheel, the axial displacement of the chain from the smaller to the larger chainwheel is completed with low noise in three stages. Firstly, an outer link plate comes into lateral contact against the reference tooth and the inner link plate presses laterally against the following tooth disposed adjacent the reference tooth. The last axial jump by the tension chain segment into its final position corresponding to the selected gear ratio occurs when inner link plate slides externally past the back of the following tooth before the chain capture tooth. Since an inner link plate that is narrow in relation to the outer link plate is in contact against the recessed tooth, the chain is in a position that is very close to its final course, so that only a very short distance remains for the third stage. For constant chain tension, the shorter the chain jump, the less noise is produced. The axial displacement of the inner link plate over the last tooth after the reference tooth is shortened because of a lateral recess or a run-out chamfer. The recess is located on the front face of the larger chainwheel facing toward the smaller chainwheel. The depth of the recess approximately equals the thickness of a link plate. Alternatively, the recess may be replaced with a run-out chamfer located on an edge of the same tooth. The run-out chamfer extends from the tooth root, on an edge of the tooth facing toward the chain capture tooth, toward the back face of the tooth until it runs into the deflection chamfer. The recess and the run-out chamfer function to change the tooth located between the reference tooth and the chain capture tooth into a "non-shifting" tooth or "non-chain capture" tooth, thereby facilitating run-off at the beginning of the shifting operation and shortening of the axial shifting displacement of the inner link plate over the last tooth to reduce the shifting noise.

If, on the other hand, an inner link plate arrives next to the reference tooth, it cannot take hold because the reference tooth has a recess; the following outer link plate cannot take hold either and pivots laterally onto the following tooth disposed adjacent the reference tooth opposite drive rotation direction that has either a deflection chamfer or a recess. If the following tooth has a deflection chamfer rather than a recess, the shifting operation does not occur at this point. The shifting operation occurs only at the next tooth group of the larger chainwheel, when an outer link plate is next to the reference tooth.

If the following tooth has a recess, the shifting operation does occur at that point because after the inner link plate failed to take hold on the reference tooth, it pivots laterally onto the following tooth having the recess. With this configuration, the outer link plate subsequent to the inner link plate contacts the run-on ramp defined by the recess and the tooth flank following it, between the first and the second tooth after the reference tooth, resulting in the inner link plate that follows being raised to a higher radial level. This inner link plate thus laterally touches the upper, chamfered region of the second tooth after the reference tooth. The chain now runs into the larger chainwheel and the gap of the following outer link plate pair then travels over the chain capture tooth. The chain capture tooth has a recess on the back face facing the next larger chainwheel that forms a shifting lane for the outer link plate. The following tooth also has a recess, or is narrower, on the back face in order to facilitate run-in of the following inner link plate. The following chain link plates are then constrained to run onto the larger chainwheel, and the tension chain segment pulls away from the teeth of the smaller chainwheel.

At the end of the shifting operation, when the tension segment of the chain slightly changes directions and jumps from the smaller to the larger chainwheel, the chain's axial displacement of the chain from the smaller to the larger chainwheel is completed with little noise and in three stages. Firstly, an outer link plate comes into lateral contact against the following tooth having a recess and rubs past it with almost no noise. The inner link plate then presses laterally against the upper, chamfered region of a third tooth disposed adjacent the following tooth opposite the drive rotation direction after the reference tooth and slides up on it to the tooth back. The last axial jump of the tension chain segment into its final position corresponding to the selected gear ratio occurs when the tooth back, extending obliquely with respect to the back face of the larger chainwheel, of the tooth located before the chain capture tooth slides externally past the inner link plate. Since an inner link plate, having an inner link plate spacing that is narrower in relation to the outer link plate spacing, is in contact against the chamfered tooth, and finally detaches from the tooth back at the back face of the larger chainwheel, the chain is in a position very close to is final course. Only a very short axial distance therefore remains for the third stage, when the lower edge of the inner link plate slides over the tooth back that extends to the back face of the larger chainwheel. Here again, a short stage has a positive effect on the shifting noise that is produced. For a constant chain tension, the shorter the chain jump that still remains, the less the noise is. The axial displacement of the inner link plate over the last tooth, the tooth before the respective chain capture tooth, is shortened by way of an oblique tooth back extending to the back face of the larger chainwheel.

Since the last contact point of the inner link plate against the obliquely extending tooth back is located close to the back face of the larger chainwheel, the axial chain displacement still remaining before the chain assumes its final course after the shifting operation is greatly decreased, and the shifting noise is thus reduced.

A further minimization of the shifting noise and of the axial chain displacement still remaining when the inner link plate detaches from the tooth that is located before the chain capture tooth in the drive rotation direction is achieved by displacing the last axial contact point on the inner link plate. With the present invention, the last contact of the outer edge of the inner link plate on the edge of the tooth back directed toward the smaller chainwheel is displaced as far as possible in the direction of the back face of the larger chainwheel.

In another embodiment of the present invention, a further shortening of the end of the shifting operation, when the chain jumps over the last tooth before the chain capture tooth, is achieved with a feature on the inner link plate. An outer surface of the inner link plate is chamfered or rounded such that the last contact point between the inner link plate and the tooth back of the tooth before the chain capture tooth is displaced from the outer edge farther toward the inner edge. This chamfering on the outer surface of the inner link plate begins at a transition from a convex outer contour of the inner link plate to a concave outer contour, the central region of the link plate, and ends at a transition from the concave outer contour to the convex outer contour. The chamfer exhibits, in the central region of the inner link plate, an almost straight-line profile of the transition line that is defined by the chamfer surface and the remaining unchamfered link plate surface. As a result, the cross section of the central region of the link plate, which is stressed in tension and torsion during the shifting operation, is not excessively weakened. This is especially important because the inner link plate already has a chamfer on its inner side in order to improve chain run-on onto the chainwheel teeth. Accordingly, this feature prevents the inner link plate from jumping abruptly over the corresponding tooth edge but instead slides smoothly over the tooth back and out of the tooth region.

The above low-noise reduction features may be individually provided to reduce shifting noise. However, a combination of the features may be provided to reduce the noise during shifting a chain from a smaller chainwheel to a larger chainwheel. At the end of the shifting operation, for example, when the tension chain segment shifts from the smaller to the larger chainwheel, the undesired contact of both an outer link plate and an inner link plate with an unprepared tooth is prevented by way of skillfully arranged recesses on the reference tooth and a deflection chamfer or recess on a following tooth disposed adjacent the reference tooth. It is additionally possible, as a result of the recess on the reference tooth and the recess or run-out chamfer on the following tooth, for the chain to get as close as possible to the back face of the larger chainwheel. The axially proceeding shift jump of the inner link plate over the corresponding tooth back of the tension chain segment is moreover additionally reduced by chamfering the outer side of the inner link plates. This chamfering or rounding on the inner link plate moreover yields a smooth transition by the chain into the new chain course established after a successful shifting operation.

In summary, the following features are proposed in order to reduce the shifting noise occurring at the end of the shifting operation from the smaller to the larger chainwheel:
  i. providing a recess on the reference tooth and a deflection chamfer or a recess on the following tooth disposed adjacent the reference tooth, in order to prevent the reference tooth and the following tooth from becoming a chain capture tooth at the beginning of the shifting operation;
  ii. providing a recess on the reference tooth and a run-out chamfer or a recess on the following tooth, so that the shortest possible axial displacement remains at the end of the shifting operation for the chain's jump over the tooth positioned before the chain capture tooth;

iii. providing a chamfer on a central region of an outer surface of the inner link plate contour, in order to decrease and slidingly initiate the remaining chain jump over the tooth back of the tooth arranged before the chain capture tooth;

iv. combining the proposed features on the reference tooth and the next tooth of the larger chainwheel with the chamfer on the outer surface of the inner link plates.

These and other features and advantages of the present invention will be more fully understood from the following description of certain embodiments of the invention, taken together with the accompanying drawings.

BRIEF DESCRIPTION OF THE DRAWINGS

In the drawings:

FIG. 3 is a plan view of the chain sequence of FIG. 2;

FIG. 5 is a plan view of the chain sequence of FIG. 4;

FIG. 8 is a plan view of the chain sequence of FIG. 7;

FIG. 10 is a plan view of the chain sequence of FIG. 9;

DETAILED DESCRIPTION

Figure 1:
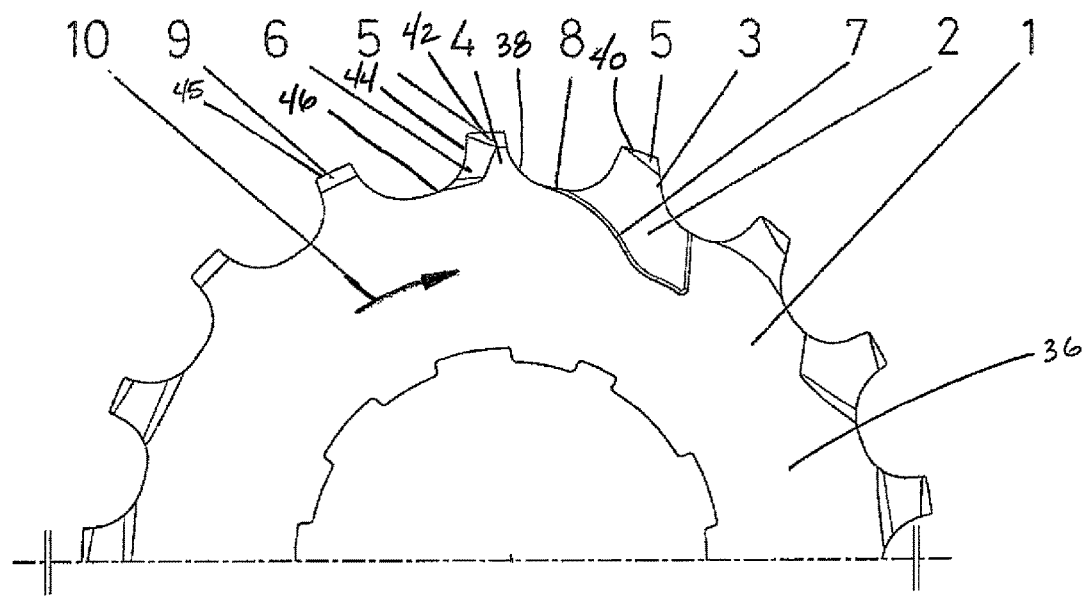
FIG. 1 is a partial front view of a larger chainwheel having a recess on a reference tooth and a following tooth disposed adjacent the reference tooth having deflection and run-out chamfers in accordance with one embodiment of the present invention.

FIGS. 1-5 shows a chainwheel assembly including at least one smaller chainwheel 11 and at least one larger chainwheel 1 in accordance with one embodiment of the present invention. The chainwheels 1, 11 are engageable by a chain 12 that is made up of successive pairs of inner and outer link plates 13, 14 arranged in alternating sequence. The link plates 13, 14 are connected by pins 16 and the pins 16 are surrounded by rollers 15. The larger chainwheel 1 and the smaller chainwheel 11 are oriented relative to each other such that a distance between a center of a chain roller 34 positioned between a pair of adjacent teeth on the larger sprocket 1 and the center of a chain roller 32 between a pair adjacent teeth on the smaller chainwheel 11 is substantially an integer multiple of the chain pitch. The larger chainwheel 1 includes at least one tooth group that includes a first tooth or reference tooth 3 and a second or following tooth 4 disposed adjacent the reference tooth 3 opposite the drive rotation direction 10. The reference tooth 3 includes a recess 2 and the following tooth 4 includes a run-out chamfer 6. This tooth group may be provided more than once on the periphery of the large chainwheel 1.

The larger chainwheel 1 is not necessarily the largest chainwheel of the chainwheel assembly, but is merely larger than the smaller chainwheel 11 from which the chain 12 is shifted onto the adjacent larger chainwheel 1. Recess 2 of the reference tooth 3 is located on a front face 36 of the larger chainwheel 1 facing the smaller chainwheel 11. The depth of the recess 2 approximately equals the thickness of the link plate. The recess 2 tapers off at a tooth root 8 between the reference tooth 3 and the following tooth 4. Recess 2 defines, together with the flank 38 of the following tooth 4 facing toward the reference tooth 3, a run-on ramp 7 that enables the bracing of the outer link plate 13 at the beginning of the shifting operation. In addition to the recess 2, the reference tooth 3 has a deflection chamfer 5 that is very pronounced at the beginning of the reference tooth 3, in the drive rotation direction 10, and then tapers off toward the back 40 of the tooth 3. The following tooth 4 includes a deflection chamfer 5 that extends approximately parallel to a tooth back 42 which is either contiguous to the back face of the larger chainwheel directed toward the next larger chainwheel or located in very close proximity thereto. The recess 2 on the reference tooth 3 and the deflection chamfers 5 on the reference and following teeth 3, 4 prevent the respective tooth 3, 4 from penetrating into the gap between the pair of outer link plates, thus making both teeth 3, 4 into non-chain capture or non-shifting teeth. The following tooth 4 further includes a run-out chamfer 6 disposed on an edge 44 of the following tooth 4 facing away from the reference tooth 3. The run-out chamfer 6 begins at a tooth root 46 between a third or chain capture tooth 9 and the following tooth 4 and extends outward to the tooth back 42 or transitions into the deflection chamfer 5. The run-out chamfer 6 becomes wider toward the tooth back 42, and the following tooth 4 becomes increasingly thinner in the region of the chamfer 6. On the one hand this run-out chamfer 6 defines a shifting lane to the adjacent chain capture tooth 9; and on the other hand, at the end of the shifting operation, an inner link plate 14 slides up on the chamfer 6 until it finally, in the immediate vicinity of the back face of the larger chainwheel 1, jumps over the tooth back 45. The chain capture tooth 9 has a recess on the back face extending to the tooth root that is a continuation of the shifting lane.

Figure 2:
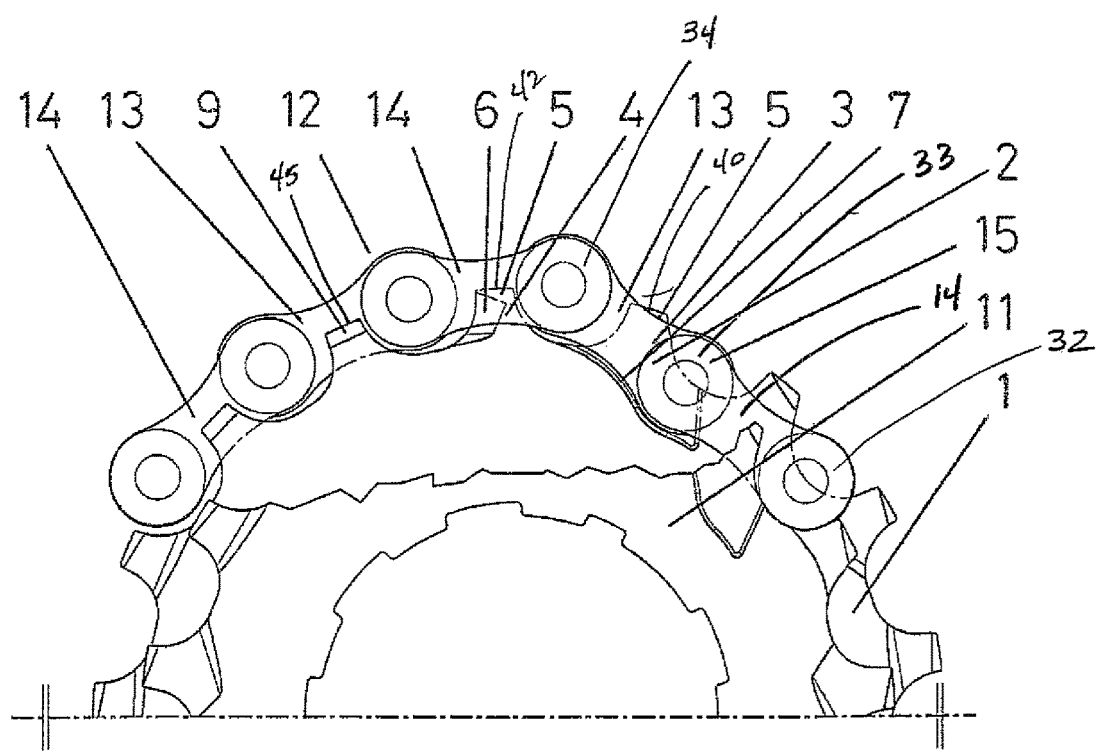
FIG. 2 is a partial front view of the larger chainwheel of FIG. 1, a smaller chainwheel and a chain having an outer link plate alongside the reference tooth.

FIG. 2 shows the smaller chainwheel, the larger chainwheel of FIG. 1 and only the front inner and outer link plates 13, 14 of the chain 12 are shown; the rear inner and outer link plates are not depicted. The chain 12 is being shifted from the smaller chainwheel 11 to the larger chainwheel 1 and an outer link plate 13 is engaged alongside the reference tooth 3 of the larger chainwheel 1. By definition, the reference tooth 3 is the first tooth before the tooth space on the larger chainwheel 1 that a chain link would fit at the beginning of the shift operation when a chain segment rubs past the larger chainwheel 1. In FIG. 2, the first chain roller 32 is still engaged with the smaller chainwheel 11, whereas a third chain roller 34 would fit into the tooth space between the reference tooth 3 and the following tooth 4. The first two chain rollers 32, 33 are joined to one another by inner link plates 14. The outer link plate 13 braces against the run-on ramp 7, having been prevented by deflection chamfer 5 from climbing over the reference tooth 3. This run-on ramp 7 is defined by the recess 2 and is located on the front face 36 of the larger chainwheel 1 facing the smaller chainwheel 11. The outer link plate 13 braces against the run-on ramp 7 and brings the following inner link plate 14 to the level of the reference circle on the larger chainwheel 1. The run-out chamfer 6 on the following tooth 4 allows the inner link plate 14 to make a first axial step toward the larger chainwheel 1. The following outer link plate 13 then travels over chain capture tooth 9, which has a recess on the back face of the larger chainwheel 1 that functions as an extension of the run-out chamfer 6 of the preceding tooth. The following inner link plates, and further chain links of chain 12, then run automatically onto the larger chainwheel 1.

At the end of the shifting operation, the tension segment of the chain 12 pulls away from the smaller chainwheel 11. The outer link plate 13 slides up on the recessed reference tooth 3 and the inner link plate 14 slides along the run-out chamfer 6 toward the back face, as far as the tooth back 42 of the following tooth 4. The tension segment of the chain 12 then jumps over the tooth back 45 and assumes its final position corresponding to the selected gear ratio. During this shifting operation, the inner link plate 14 travels along the run-out chamfer 6 from the front face on the tooth root 8 of the following tooth 4 to the tooth back 42, which is located in the immediate vicinity of the back face of the larger chainwheel 1. The axial displacement required for the chain jump and the shifting noise associated therewith, are thereby reduced.

FIG. 3 shows the chain sequence of FIG. 2 in plan view and the chain 12 is depicted as transparent (except for rollers 15) for better understanding. The chain 12 is shifting from the smaller chainwheel 11 to the larger chainwheel 1. The chain transition segment extends from a chain roller 32 that is the last chain roller to fit between the two teeth of the smaller chainwheel 11 to a chain roller 34 that is the first to fit between two teeth of the larger chainwheel 1. The first tooth on the larger chainwheel 1 before the space into which the chain roller 15 would optimally fit during the shifting operation is the reference tooth 3, and the chain capture tooth 9 is the first tooth to penetrate between an outer link plate pair 13. Upon the chain 12 being laterally displaced by the derailleur toward the larger chainwheel 1, the outer link plate 13 arrives at the reference tooth 3. The recess 2 and the deflection chamfer 5 on the reference tooth 3 prevent the outer link plate 13 from getting over the reference tooth 3, i.e. prevents the reference tooth 3 from inserting into the gap between the pair of outer link plates 13. The deflection chamfer 5 on the following tooth 4 likewise prevents the chain 12 from getting over the tooth back with the following inner link plate 14. The chain capture tooth 9 is the first to fit between the following outer link plate pair 13, thus forcing the remainder of the chain 12 to follow onto the larger chainwheel 1. Located on the back of the chain capture tooth 9 and of the next tooth, respectively, is a recess 2 or a corresponding chamfer that, together with run-out chamfer 6, define a combined shifting lane.

At the end of the shifting operation, when the tension segment of the chain 12 pulls away from the smaller chainwheel 11, the outer link plate 13 slides past the recess 2 almost with no noise. The following inner link plate 14 brushes along the run-out chamfer 6 to the tooth back. Inner link plate 14 or chain 12 covering an axial distance in this context, so that the jump over the tooth back 45 is not so large; this contributes to reducing the shifting noise.

Figure 4:
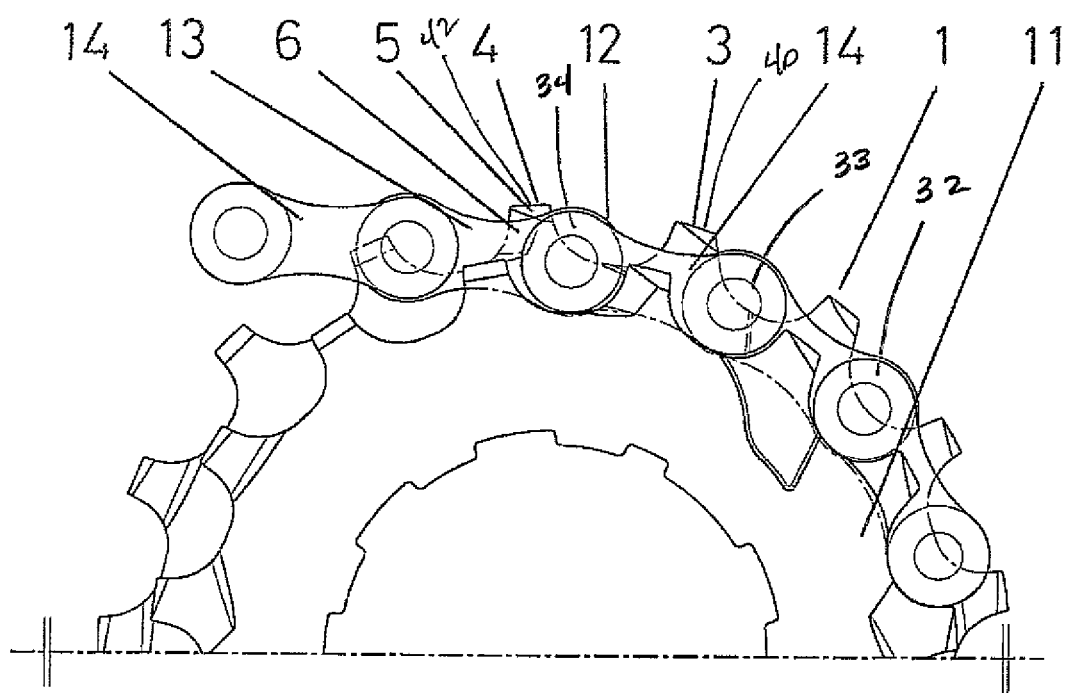
FIG. 4 is a partial front view of the larger chainwheel of FIG. 1, the smaller chainwheel and the chain having an inner link plate alongside the reference tooth.

FIG. 4 shows the smaller chainwheel 11, the larger chainwheel 1 of FIG. 1 and the chain that is being shifted from the smaller chainwheel 11 to larger chainwheel 1. The inner link plate 14 of chain 12 is shown engaged alongside reference tooth 3 of the larger chainwheel 1. As the chain 12 is shifting from the smaller chainwheel 11 to the larger chainwheel 1, a portion of the chain forms the chain transition segment. The inner link plate 14 pivots laterally past the reference tooth 3 and the following outer link plate 13 is prevented by the deflection chamfer 5 from climbing over the following tooth 4, resulting in the outer link plate 13 laterally displacing past the following tooth 4. The inner link plate 14 also does not fit over the tooth back of the chain capture tooth 9 after the reference tooth 3. The shifting operation does not occur at this tooth group but occurs only when the outer link plate 13 is once again laterally alongside the next reference tooth 3. The shifting operation then proceeds as it has been explained in the description of FIG. 2.

FIG. 5 shows the chain sequence of FIG. 4 in plan view and depicts chain 12 as transparent, except for the rollers 15, for better understanding. The chain 12 is shifting from the smaller chainwheel 11 and the larger chainwheel 1. The chain 12 is being laterally displaced by the derailleur (not shown), toward the larger chainwheel 1, causing the inner link plate 14 to laterally displace against the reference tooth 3. The recess 2 and the deflection chamfer 5 on the reference tooth 3, and the set-back position of the inner link plate 14 with respect to the outer link plate 13, prevent the inner link plate 14 from getting over the reference tooth 3, and the reference tooth 3 from inserting into the space between the inner link plate pair 14. The deflection chamfer 5 on the following tooth 4 likewise prevents the following tooth 4 from inserting between the outer link plates 13 of the chain 12. The following inner link plate 14 and the outer link plate 13 likewise do not get over the tooth backs 42, 43 of the second and the third teeth after the reference tooth 3. This shifting operation is therefore not successful at this chainwheel segment of the larger chainwheel 1, but succeeds only when the outer link plate 13 is once again laterally engaged against the next reference tooth 3. The shifting operation then proceeds as has been explained in the description of FIGS. 2 and 3.

Figures 6, 7:
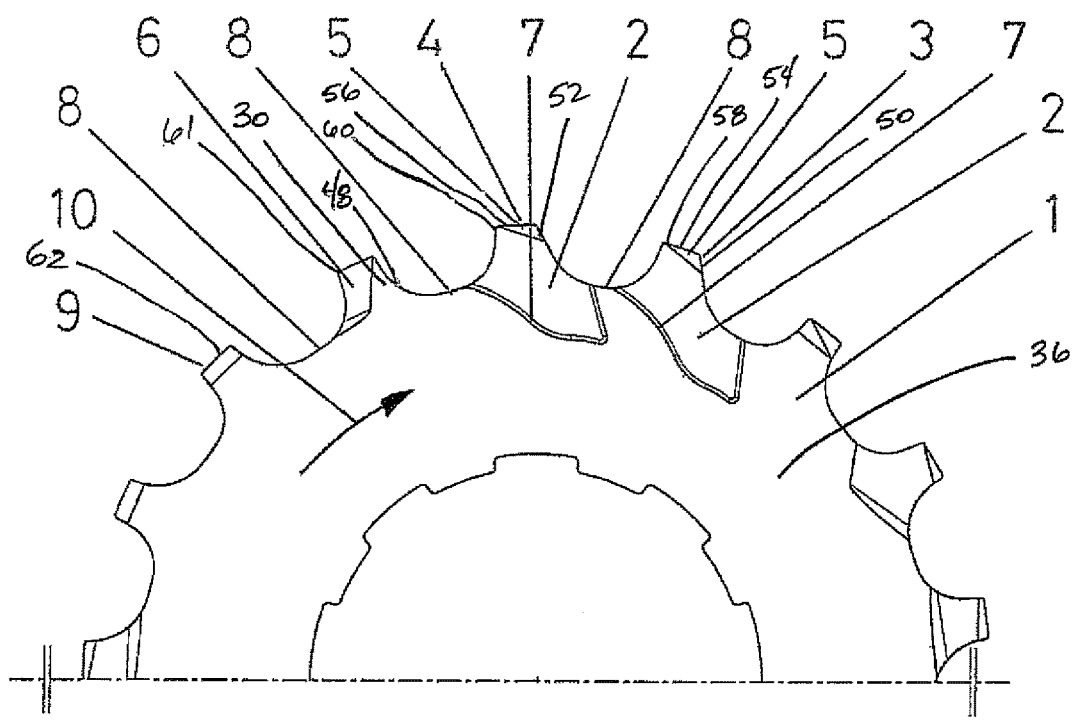
FIG. 6 is a partial front view of a larger chainwheel having a recess on the reference tooth and the following tooth in accordance with another embodiment of the present invention.
FIG. 7 is a partial front view of the larger chainwheel of FIG. 6, the smaller chainwheel and the chain having an outer link plate alongside the reference tooth.

FIG. 6 shows a portion of a larger chainwheel with a recess 2 on the reference tooth 3 and the following tooth 4 in accordance with another embodiment. The tooth group, including the first or reference tooth 3 and the second or following tooth 4 disposed adjacent to the reference tooth 3 opposite drive rotation direction, may be arranged more than once on the periphery of the larger chainwheel 1. The recess 2 on the reference tooth 3 is disposed on the front face 36 of the larger chainwheel 1 facing the smaller chainwheel 11 and extends from the tooth region to approximately the root circle of the adjacent smaller chainwheel 11. The depth of the recess 2 approximately equals the thickness of the link plate. The recess 2 on the reference tooth 3 defines a run-on ramp 7 that tapers off at a tooth root 8 of the following tooth 4. The run-on ramp 7 allows the bracing of the outer link plate 13 at the beginning of the shifting operation. The recess 2 on the following tooth 4 likewise defines a run-on ramp 7 together with the following tooth flank 48. Alternatively, one combined recess extending over the two teeth may be provided rather than two adjacent recesses arranged independently of one another.

The deflection chamfer 5 on the reference tooth 3 and on the following tooth 4 is pronounced at one edge 50, 52 (viewed in the rotation direction 10) of the respective tooth 3, 4, and tapers off toward the tooth backs 54, 56 on opposite edges 58, 60 of the respective tooth 3, 4. The recess 2 and the deflection chamfer 5 prevent the respective tooth from inserting between the outer link plates 13, resulting in both teeth, the reference and the following teeth 3, 4, acting as non-chain capture or non-shifting teeth. A third tooth 30 adjacent the second or following tooth 4 opposite the drive rotation direction includes a run-out chamfer 6 on a front face of the tooth 30. The chamfer 6 extends and becomes wider from the tooth root 8 to the tooth back. The inner link plate 14 slides up on the run-out chamfer 6 at the end of the shifting operation until the inner link plate 14, in the immediate vicinity of the back face of the larger chainwheel 1, jumps over the tooth back. The chamfer 6 also functions as a shifting lane for the chain capture tooth 9. The chain capture tooth 9 has on the back face of the larger chainwheel 1 a recess extending to the tooth root 8 that continues the shifting lane.

FIG. 7 shows the smaller chainwheel 11, the larger chainwheel 1 of FIG. 6 and the outer link plate 13 of the chain 12 alongside the reference tooth 3 of the larger chainwheel 1. The chain 12 is being shifting from the smaller chainwheel 11 to the larger chainwheel 1, thereby a portion of the chain 12 forming a chain transition segment. The deflection chamfer 5 and the recess 2 prevent the outer link plate 13 from getting over the tooth back 54 of the reference tooth 3. The outer link plate 13 slides laterally along the recess 2 to the run-on ramp 7 and braces itself thereagainst. The recess 2 defines the run-on ramp 7 that is located on the front face 36 of the larger chainwheel 1 facing the smaller chainwheel 11. The depth of the recess 2 approximately equals the thickness of the link plate. The outer link plate 13, bracing against run-on ramp 7, brings the following inner link plate 14 to the level of the reference circle on the larger chainwheel 1. The recess 2 on the following tooth 4 allows the inner link plate 14 to make a first axial step toward the larger chainwheel 1. The following outer link plate 13 then gets over the third tooth 30 that functions as the chain capture tooth and is equipped on the back face of the larger chainwheel 1 with a chamfer or a recess that assists the run-on of the outer link plate 13. The following inner link plates and further chain links of chain 12, then automatically run onto the larger chainwheel 1.

At the end of the shifting operation, the tension segment of the chain 12 pulls away from the smaller chainwheel 11. The chain 12 changes its track when the outer link plate 12 slides up on the recessed reference tooth 3, and the inner link plate 14 slides along recess 2 to the tooth back 56 of the following tooth 4. The tension segment of the chain 12 then jumps over the tooth back 61 and assumes the final position corresponding to the selected gear ratio. The inner link plate 14 travels along recess 2 from the front face on the tooth root 8 of the following tooth 4 to the tooth back 56 that is located in the immediate vicinity of the back face of the larger chainwheel 1. The axial displacement still required for the chain jump, and the shifting noise associated therewith, are thereby reduced.

FIG. 8 shows the chain sequence of FIG. 7 in plan view and depicts the chain, except for the rollers 15, as transparent for better understanding. The chain 12 is being shifted by a derailleur (not shown) toward the larger chainwheel 1, resulting in the outer link plate 13 arriving at the reference tooth 3. The recess 2 and the deflection chamfer 5 on the reference tooth 3 prevent the reference tooth 3 from inserting into the gap between the outer link plate pair 13. The recess 2 and the deflection bevel 5 on the following tooth 4 likewise prevent the following inner link plate 14 of the chain 12 from getting over the tooth back 56. The chain capture tooth 30 is the first to penetrate successfully between the following outer link plate pair, thereby forcing the remainder of the chain to follow onto the larger chainwheel 1. The run-out of the chain 12 is facilitated by further recesses 2 on the back face of the chain capture tooth 30 and of the next tooth. This creates, together with recess 2, a shifting lane for the corresponding chain link plates.

At the end of the shifting operation, when the tension segment of the chain 12 pulls away from the smaller chainwheel 11, the outer link plate 13 slides past recess 2 almost noiselessly. The following inner link plate 14 brushes along recess 2 to the tooth back 56 of the following tooth 4. The inner link plate 14 is thereby already starting an axial displacement toward the final chain position, so that the jump of the chain 12 over the tooth back 61 is not so large, and the shifting noise is reduced.

Figure 9:
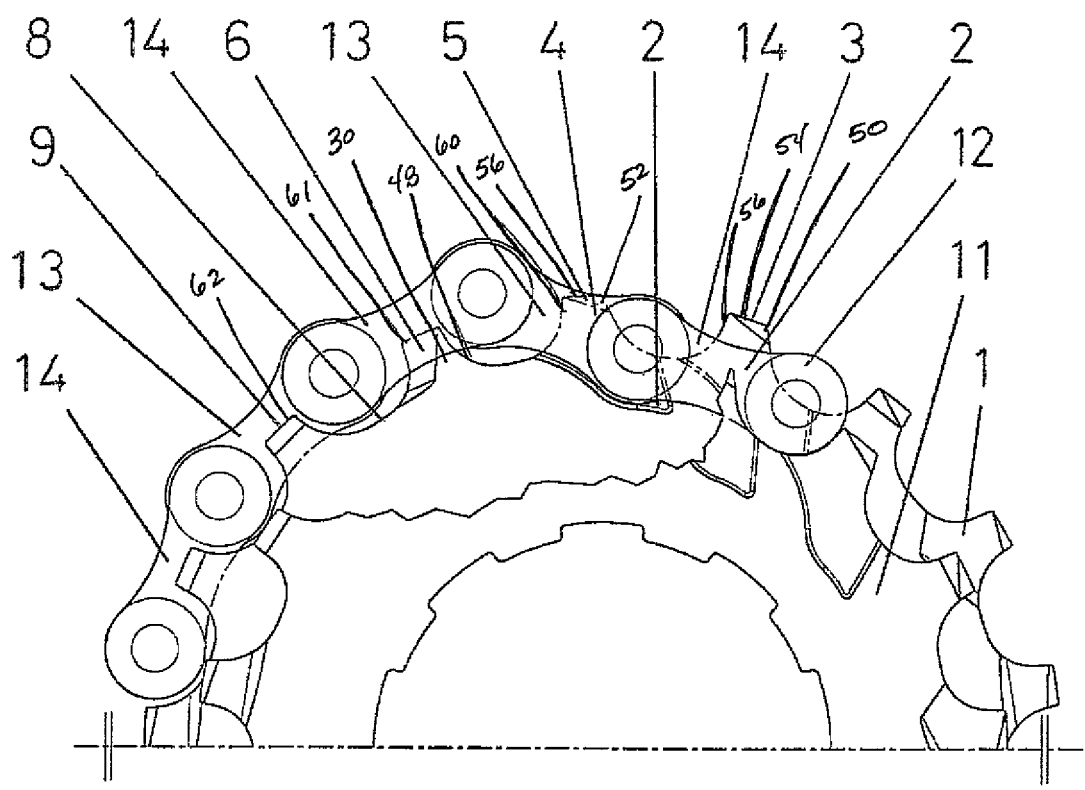
FIG. 9 is a partial front view of the larger chainwheel of FIG. 6, the smaller chainwheel and the chain having an inner link plate alongside the reference tooth.

FIG. 9 shows the smaller chainwheel 11, the larger chainwheel 1 and the chain being shifted from the smaller chainwheel 11 to the larger chainwheel 1. The inner link plate 14 of the chain 12 is engaged alongside the reference tooth 3 of the larger chainwheel 1. In this embodiment of the invention, the reference tooth 3 and the following tooth 4 have a recess 2. As the chain 12 shifts from the smaller chainwheel 11 to the larger chainwheel 1, a portion of the chain 12 forms a chain transition segment. The inner link plate 14 laterally displaces past the reference tooth 3. The following outer link plate 13 is prevented by the deflection chamfer 5 from climbing over the following tooth 4, and laterally displaces past the following tooth 4 until it braces against run-on ramp 7 defined by the recess 2 and the tooth flank 48 following it. As a result, the following inner link plate 14 arrives at the level of the reference circle of the larger chainwheel 1. The run-out chamfer 6 on the third tooth 30 defines a shifting lane that allows that inner link plate 14 to make a first axial step toward the larger chainwheel 1. The following outer link plate 13 then gets over the chain capture tooth 9 that has a chamfer or recess on the back face of the tooth 9 that functions as an extension of the shifting lane of the preceding tooth. The following inner link plate 14 and the further chain links of chain 12, then run automatically onto the larger chainwheel 1.

At the end of the shifting operation, the tension segment of the chain 12 rotates away from the smaller chainwheel 11. This occurs, when the outer link plate 13 slides up on the recessed following tooth 4 and the following inner link plate 14 slips along the run-out chamfer 6 on the third tooth 30 to the tooth back 61, in the process moving toward the back face of the larger chainwheel 1. The tension segment of the chain 12 then jumps over the tooth back 62 and assumes its final position corresponding to the selected gear ratio. The inner link plate 14 travels along the run-out chamfer 6 from the front face on the tooth root 8 of the tooth arranged before the chain capture tooth 9 to the tooth back 61 located in the immediate vicinity of the rear surface. The axial travel still required for the chain jump, and the shifting noise associated therewith, are thereby reduced.

The above embodiment, having two adjacent recesses 2 on the reference tooth 3 and the following tooth 4, has an advantage over the embodiment shown in FIG. 4, having a recess 2 on the reference tooth 3 and a deflection chamfer 5 and a run-out chamfer 6 on the following tooth 4, which is the shifting operation from the smaller chainwheel 11 to the larger chainwheel 1 is successful every time, i.e. even when an inner link plate 14 is present alongside the reference tooth 3 at the beginning of the shifting operation.

FIG. 10 shows the chain sequence of FIG. 9 in plan view and depicts the chain 12, except the rollers 15, as transparent for better understanding. The chain 12 is being shifted by a derailleur (not shown) toward the larger chainwheel 1, causing the inner link plate 14 to arrive alongside the reference tooth 3. The recess 2 and the deflection chamfer 5 on the reference tooth 3 and the narrow spacing between the inner link plates 14 prevent the reference tooth 3 from fitting into the space between the inner link plates 14. The recess 2 and the deflection chamfer 5 on the following tooth 4 likewise prevent the outer link plate 13 of the chain 12 from getting over the tooth back 56. The next inner link plate 14 also rubs past the third tooth 30. The chain capture tooth 9 is the first to fit successfully between the following pair of outer link plates 13, thereby also forcing the remainder of the chain 12 to follow onto the larger chainwheel 1. The run-on of the chain 12 is facilitated by further recesses 2 on the back face of the chain capture tooth 9 and of the next tooth. This creates, together with the run-out chamfer 6, a shifting lane for the corresponding chain link plates.

At the end of the shifting operation, when the tension segment of the chain 12 pulls away from the teeth of the smaller chainwheel 11, the outer link plate 13 slides past recess 2 of the following tooth 4 almost noiselessly. The following inner link plate 14 brushes along run-out chamfer 6 to the tooth back of the tooth located before the chain capture tooth 9. The inner link plate 14 is thereby already starting an axial displacement toward the final chain position, so that the jump of the chain 12 over the tooth back 62 is not too large, and the shifting noise is thereby reduced.

Figure 11:
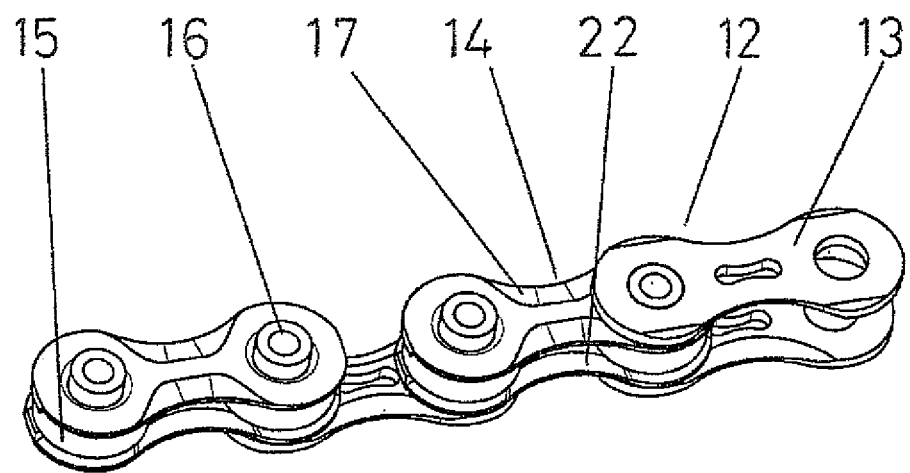
FIG. 11 is a portion of a chain having inner link plates that are chamfered on an outer surface of the inner link plate in accordance with another embodiment of the present invention.

FIG. 11 shows a portion of chain 12 having externally chamfered inner link plates 14 in accordance with another embodiment of the present invention. The chain 12 is made up of chain rollers 15 that are located between inner link plates 14 and the outer link plates 13. The link plates 13, 14 and chain rollers 15 are held together by link pins 16. The ends of the pins 16 are riveted in the region of the outer link plates 13. The inner surfaces of the inner link plates 14 have inner chamfers 22 located in the central region of the inner side to allow the teeth on the chainwheel to be inserted smoothly into the chain gaps. The inner link plates 14 are also chamfered on an outer surface of the inner link plate 14. The link plate chamfers 17 are arranged symmetrically, and begin where the convex outer contour of the link plate transitions into the central concave outer contour and ends where the concave outer contour of the link plate transitions into the convex outer contour. After the link plate chamfer 17 has reached its maximum width or depth, it continues at a constant depth in the central region of the inner link plate 14. The result is to create a straight central portion of link plate chamfer 17 on the outer surface of the link plate. In the assembled state, the link plate chamfers 17 extend from one outer link plate 13 to the other. All that remains of the original outer surface of the inner link plate 14 is a narrow ridge in the central region of the link plate. The inner chamfer 22 and outer chamfer 17 on the outer edge of the inner link plate 14, form in the central region of the link plate as either one combined edge or two closely adjacent edges that, when rounded off, appear as one line.

Figure 12:
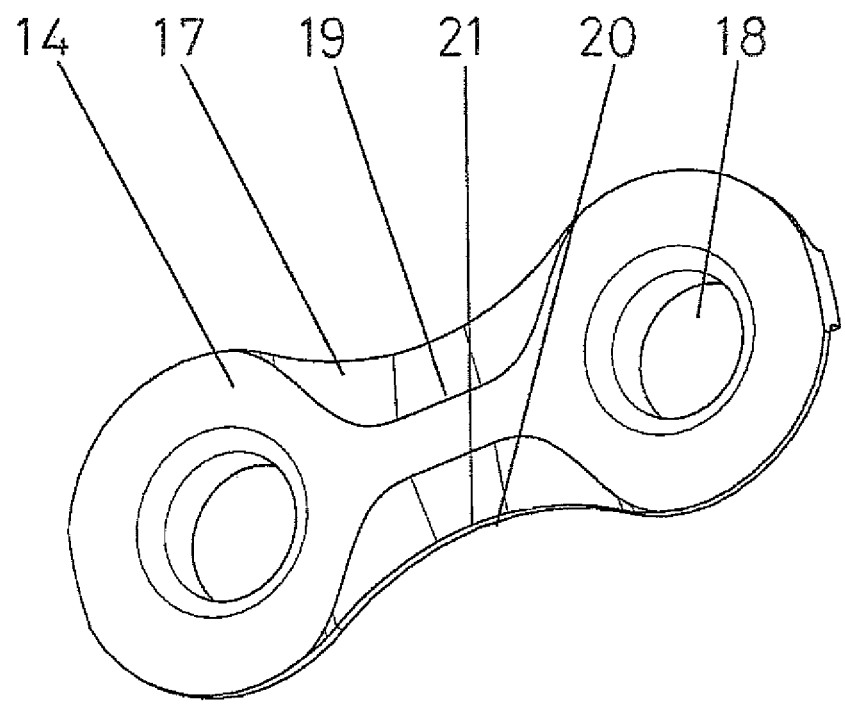
FIG. 12 is a perspective view of one of the inner link plates of FIG. 11.

FIG. 12 shows outer chamfers 17 on the outer edge of the inner link plate 14. The flat surface on the ends of the inner link plate 14 is penetrated by two pin orifices 18. The outer chamfers 17 extend on both sides over the central region of the inner link plate 14, and begin where the convex outer contour of the link plate transitions into the central concave outer contour and end where the concave outer contour of the link plate transitions into the convex outer contour. In the central region of the link plate, the chamfers 17, as well as the remaining flat outer surface of inner link plate 14, exhibit a straight-line chamfer profile 19. This results in a long chamfer length with an approximately constant link plate cross section. The largest possible chamfer depth is critical in terms of reducing shifting noises; it extends from the link plate surface approximately to the inner chamfer edge 20. An outer chamfered edge 21 and the inner chamfered edge 20 are thus located close to one another and, if these edges are additionally rounded off, can form a combined narrow link plate edge.

Figure 13:
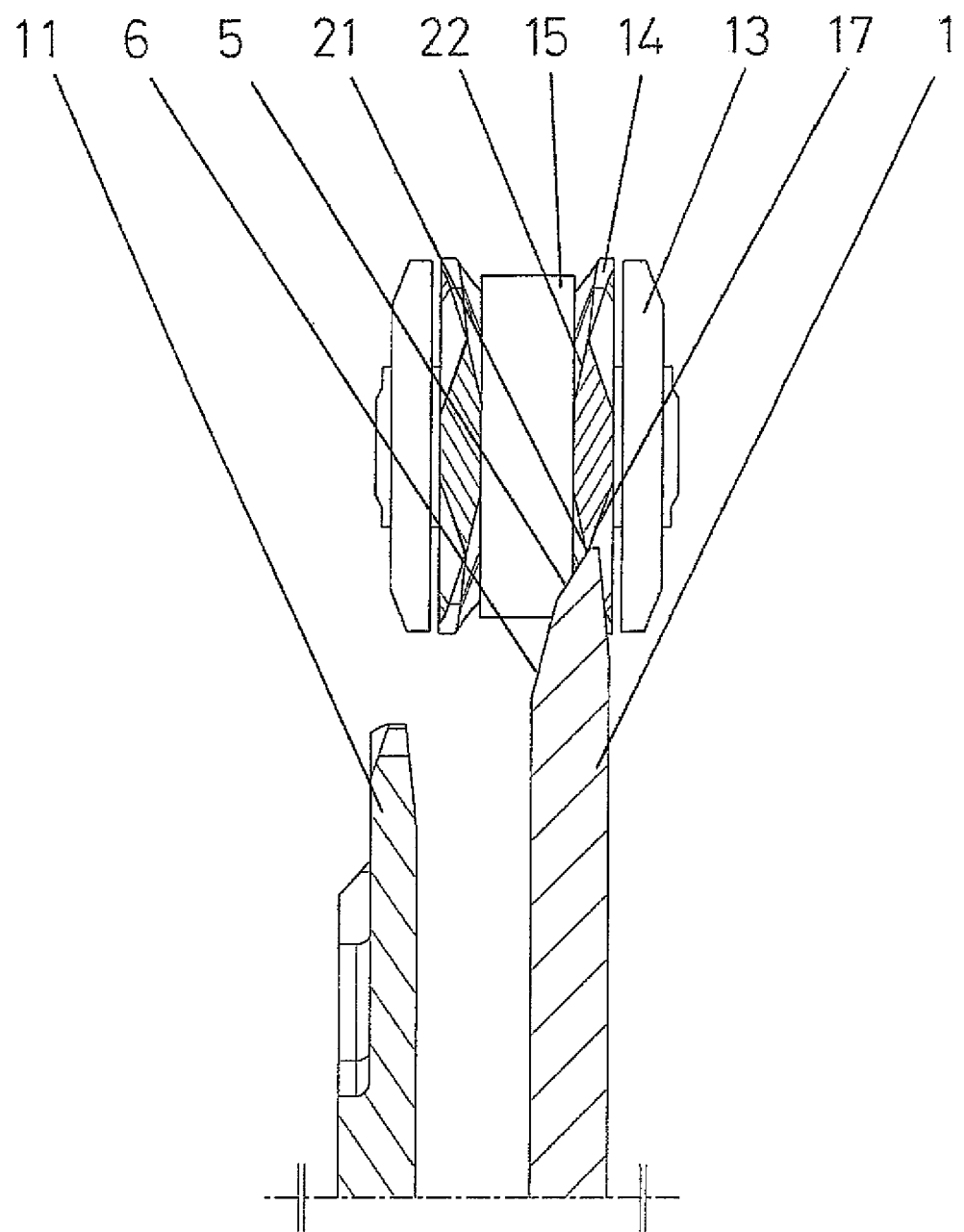
FIG. 13 is a cross-sectional view of a larger chainwheel and a pair of inner link plates of a chain before the chain jumps to a final position at the end of a shifting operation.

FIG. 13 shows a cross-sectional view of the larger chainwheel 1, the pair of inner link plates 14, the pair of outer link plates 13 and the chain roller 15 before the chain jumps from the smaller chainwheel 11 onto the larger chainwheel 1 into its final position at the end of the shifting operation. The inner link plate 14 is in contact on the inside, with the link plate edge of the central side plate region or with outer chamfer edge 21, against the tooth back arranged before the chain capture tooth. The outer chamfer edge 21 is defined by the outer chamfer 17 and the inner chamfer 22. The inner link plate 14 slides along the outer chamfer 17 in the axial direction over the tooth back. Because of the run-out chamfer 6 and the deflection chamfer 5, the tooth back is already located in the immediate vicinity of the back face of the tooth. In this position, the outer surface of the inner plate 14 is in the immediate vicinity of the notional line to the back face of the larger chainwheel 1. The inner link plate 14 and the chain 12 have now traveled the maximum possible axial distance toward the final chain position before they jump over the tooth back. The remaining axial chain travel before the chain is resting entirely on the larger chainwheel 1 is thus minimized by way of outer chamfer 17.

While this invention has been described by reference to several embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed:

1. A chain engageable with a chainwheel assembly including a plurality of chainwheels having different tooth counts, the chain comprising:
   a plurality of inner links having inner link plates;
   a plurality of outer links having outer link plates; and
   a plurality of pins joining the outer and inner links in alternating sequence,
   the inner link plate having a chamfer disposed on a surface of a link plate, the chamfer disposed on a central region of an inner link extending between two points, the chamfer having a contour between the two points that is discontinuous at a central region of the inner link plate.

2. The chain of claim 1, wherein the central region comprises a constant depth region of the chamfer.

3. The chain of claim 1, wherein the chamfer includes, in the central region of the inner link plate, an approximately straight line chamfer profile of a transition line that is defined by the chamfer surface and the remaining unchamfered outer side surface of the inner link plate.

4. The chain of claim 1, wherein the inner link plate includes an inner chamfer on an inner surface of the inner link plate and an outer chamfer on an outer surface of the inner link plate, the inner and outer chamfers form, in the central region of the inner link plate, a combined edge that is substantially closer to the inner surface than to the outer surface.

5. The chain of claim 4, wherein the inner and outer chamfers are rounded and disposed on longitudinal sides of the inner link plate.

6. The chain of claim 1, wherein the inner link plate includes an inner chamfer disposed on an inner surface.

7. The chain of claim 1, wherein the chain engages a chainwheel assembly having at least one smaller chainwheel and at least one larger chainwheel having a first tooth including a recess configured to include a run-on ramp and a second tooth disposed adjacent the first tooth opposite the drive rotation direction having a run-out chamfer and one of a recess having a run-on ramp and deflection chamfer.

8. The chain of claim 7, wherein the run-on ramp extends beyond a root of the tooth into an edge of the second tooth.

9. The chain of claim 1, wherein the inner link plate has a second chamfer disposed on the surface of the link plate, the second chamfer and the first chamfer forming a ridge of constant thickness therebetween.

10. A chain engageable with a chainwheel assembly including a plurality of chainwheels having different tooth counts, the chain comprising:
a plurality of inner links having inner link plates;
a plurality of outer links having outer link plates; and
a plurality of pins joining the outer and inner links in alternating sequence,
an inner link of having an inner link plate comprising a first and a second chamfer disposed on a surface of a link plate, the first and the second chamfer forming a ridge of constant thickness therebetween,
wherein the chamfer includes, in a central region of the inner link plate, an approximately straight line chamfer profile of a transition line that is defined by the chamfer surface and the remaining unchamfered outer side surface of the inner link plate.

11. The chain of claim 10, wherein the first and second chamfer are disposed on a central region of an inner link, each extending between two points, the first and the second chamfer having a contour between the two points that is discontinuous at a central region of the inner link plate.

12. The chain of claim 11, wherein the central region comprises a constant depth region of the chamfer.

13. The chain of claim 10, wherein the inner link plate includes an inner chamfer on an inner surface of the inner link plate and an outer chamfer on an outer surface of the inner link plate, the inner and outer chamfers form, in the central region of the inner link plate, a combined edge that is substantially closer to the inner surface than to the outer surface.

14. The chain of claim 13, wherein the inner and outer chamfers are rounded and disposed on longitudinal sides of the inner link plate.

15. The chain of claim 10, wherein the inner link plate includes an inner chamfer disposed on an inner surface of the link plate.

16. The chain of claim 10, wherein the chain engages a chainwheel assembly having at least one smaller chainwheel and at least one larger chainwheel having a first tooth including a recess configured to include a run-on ramp and a second tooth disposed adjacent the first tooth opposite the drive rotation direction having a run-out chamfer and one of a recess having a run-on ramp and deflection chamfer.

17. The chain of claim 16, wherein the run-on ramp extends beyond a root of the tooth into an edge of the second tooth.

* * * * *